US008825621B2

(12) United States Patent
Cushing et al.

(10) Patent No.: US 8,825,621 B2
(45) Date of Patent: *Sep. 2, 2014

(54) TRANSFORMATION OF COMPLEX DATA SOURCE RESULT SETS TO NORMALIZED SETS FOR MANIPULATION AND PRESENTATION

(75) Inventors: David B. Cushing, Ottawa (CA); Robin N. Grosset, Ottawa (CA); Charles Ng, Ottawa (CA); Martin Petitclerc, Quebec (CA)

(73) Assignee: International Business Machines Corporation, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/545,520

(22) Filed: Jul. 10, 2012

(65) Prior Publication Data
US 2013/0097151 A1 Apr. 18, 2013

Related U.S. Application Data

(63) Continuation of application No. 13/276,134, filed on Oct. 18, 2011.

(51) Int. Cl.
*G06F 17/30* (2006.01)
(52) U.S. Cl.
USPC ............ 707/706; 707/718; 707/722; 707/769
(58) Field of Classification Search
CPC ................... G06F 17/30404; G06F 17/30592; G06F 17/246; G06Q 10/00; G06Q 10/06; G06Q 10/067; G06Q 10/08; G06Q 2250/30; Y10S 707/99933; Y10S 707/99945; Y10S 707/99948; Y10S 707/956; Y10S 707/957

USPC .................. 707/706, 718, 722, 769; 705/404; 715/212
See application file for complete search history.

(56) References Cited

U.S. PATENT DOCUMENTS 5,963,946 A 10/1999 Yanagimoto
6,775,660 B2 8/2004 Lin et al.
(Continued)

OTHER PUBLICATIONS

Shinpei Karneoka et al., "Automatic Layout Modification on Publishing System Using SuperSQL," IPSJ Transactions on Databases, Sep. 15, 2005, vol. 46, No. SIG13(TOD27), pp. 78-93 (English Abstract only).

(Continued)

*Primary Examiner* — Cheryl Lewis
(74) *Attorney, Agent, or Firm* — Shumaker & Sieffert, P.A.

(57) ABSTRACT

An enterprise business intelligence system includes a data access service. In one example, a method comprises receiving, with a data access service, a query and a report specification from an application, wherein the data access service is positioned between the application and a data source; creating a run tree that comprises a sequence of executable decoration nodes; executing the query on the data source, thereby providing a query result set comprising query results drawn from the data source that are responsive to the query; and executing the sequence of decoration nodes on the query result set. The decoration nodes modify the query result set, thereby producing a decorated result set based on the query result set and the decoration nodes. Producing the decorated result set comprises associating members or values in the query results with corresponding positions or calculated members in the report specification.

17 Claims, 8 Drawing Sheets

(56) References Cited

U.S. PATENT DOCUMENTS

| | | | |
|---|---|---|---|
| 6,868,413 | B1 | 3/2005 | Grindrod et al. |
| 7,331,015 | B2 | 2/2008 | Hays et al. |
| 7,430,562 | B1 | 9/2008 | Bedell et al. |
| 7,779,031 | B2 * | 8/2010 | Grosset et al. ............... 707/770 |
| 8,484,044 | B2 * | 7/2013 | Upadhyayula et al. ........... 705/2 |
| 8,583,516 | B1 * | 11/2013 | Pitt et al. ......................... 705/31 |
| 2005/0010566 | A1 | 1/2005 | Cushing et al. |
| 2007/0226242 | A1 | 9/2007 | Wang et al. |
| 2009/0049014 | A1 | 2/2009 | Steinberg |
| 2013/0097150 | A1 * | 4/2013 | Cushing et al. ............... 707/718 |

OTHER PUBLICATIONS

Kouya Okabe et al., "Quality Improvement of the SuperSQL Layout by Removal of Redundant Nests," IPSJ SIG Notes, Jul. 17, 2002. vol. 202, No. 67 2002-DBS-128 pp. 419-426 (English Abstract only).

International Search Report from corresponding application Serial No. PCT/JP2012/006630 dated Nov. 20, 2012 (3 pages).

Shaker et al. "A Rule Driven Bi-Directional Translation System for Remapping Queries and Result Sets Between a Mediated Schema and Heterogeneous Data Sources", AMIA 2002 Annual Symposium Proceedings. 2002. pp. 692-696.

Notice of Allowance from U.S. Appl. No. 13/276,134, dated Jan. 21, 2014, 11 pp.

* cited by examiner

TRANSFORMATION OF COMPLEX DATA SOURCE RESULT SETS TO NORMALIZED SETS FOR MANIPULATION AND PRESENTATION

This application is a continuation of Ser. No. 13/276,134, filed on Oct. 18, 2011, entitled TRANSFORMATION OF COMPLEX DATA SOURCE RESULT SETS TO NORMALIZED SETS FOR MANIPULATION AND PRESENTATION, the entire content of which is incorporated herein by reference.

TECHNICAL FIELD

The invention relates to the querying of data, and more particularly, to querying multidimensional and relational data in enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted other users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

In recent years vendors of multidimensional data sources for use in enterprise software systems have increasingly adopted the Multidimensional Expression query language ("MDX") as a platform for interfacing with the data sources. MDX is a structured query language that software applications utilize to formulate complex queries for retrieving and manipulating the data stored within the multidimensional data sources.

Reporting and analysis end user products (typically referred to as Business Intelligence, or BI, tools) allow users to author reports and perform data exploration and analysis on a myriad of data sources including, primarily, relational and multidimensional databases, as well as flat files, Extensible Markup Language ("XML") data, data streams, and unorganized text and data. Executing an individual report or analysis by BI tools may include processing a query in the underlying data source, retrieving data from the underlying data source and processing it directly with the BI tools, or some combination of the two.

SUMMARY

In general, the invention is directed to applying various transformations, referred to as decorations, to data source query results to enable consistent and efficient rendering of those query results in final outputs, such as report outputs, for users. These decorations, which can be thought of as transformations or modifications in the structure or format of data source query results, may be applied to results from querying any type of data source, such as multi-dimensional cubes involved with Online Analytical Processing (OLAP), and two-dimensional databases such as relational databases. Decorations may be executed on a query result set according to a decoration plan, or transformation plan, that includes one or more decoration nodes, each of which may contain, implement, or execute one or more decoration rules. A decoration rule is a rule that specifies the transformation of a result set from one format into another format. A decoration node is a node within a decoration plan (i.e. transformation plan) that defines one or more decoration rules that are to be applied to a result set.

The decoration process facilitates combining the native data processing capability of the data source with the additional data processing capability of an analytical and report generating tool. The decoration process allows all the data processing native to the data source to be performed first, but then transforms the results of that initial data processing into a structure or format that is more easily recognized and processed by the additional data processing capabilities at the report tool level.

For example, according to the techniques disclosed herein, an enterprise business intelligence software system includes a data access service that provides a logical interface to a plurality of multidimensional data sources. The data access service may, for example, execute on application servers intermediate to the software applications and the underlying data sources. The data access service permits the enterprise software applications to issue complex MDX queries on data cubes and complex SQL queries on relational databases, and decorate the results of those queries at a central level into a simplified and unified structure and format to pass to the report-generating level.

In one embodiment, a method comprises receiving, with a data access service, a query and a report specification from an enterprise software application, wherein the data access service is positioned between the enterprise software application and a data source; creating a run tree that comprises a sequence of executable decoration nodes; executing the query on the data source, thereby providing a query result set comprising query results drawn from the data source that are responsive to the query; and executing the sequence of decoration nodes on the query result set, wherein each of the decoration nodes modifies the query result set, thereby producing a decorated result set based on the query result set and the one or more decoration nodes, wherein producing the decorated result set comprises associating each of one or more members or values in the query results with a corresponding position or a calculated member in the report specification.

In another embodiment, a computing system includes an enterprise software application configured for issuing a query in accordance with a query language, a data source, and a data access service configured for executing on a computing environment between the enterprise software application and the data source. The data access service includes one or more decoration rules, a query planner, and a query execution engine. The query planner is configured for receiving the query and a report specification from the enterprise software application, and for creating a run tree to facilitate retrieving query results from the data source, wherein the run tree comprises a sequence of executable decoration nodes. The query execution engine is configured for receiving the query from the query planner and executing the query on the data source, thereby providing a query result set comprising query results drawn from the data source that are responsive to the query. The run tree is configured for executing the sequence of decoration nodes on the query result set, wherein each of the decoration nodes modifies the query result set, thereby producing a decorated result set based on the query result set and the one or more decoration nodes, wherein each of one or more of the decoration nodes modifies the query result set in accordance with a corresponding one of the decoration rules, wherein producing the decorated result set comprises associating one or more members or values in the query results with a corresponding position or a calculated member in the report specification.

In another embodiment, a computer-readable storage medium includes executable instructions stored on a computer-readable storage medium, configured for causing a programmable processor to: receive, with a data access service, a query and a report specification from an enterprise software application, wherein the data access service is positioned between the enterprise software application and a data source; create a run tree that comprises a sequence of executable decoration nodes; execute the query on the data source, thereby providing a query result set comprising query results drawn from the data source that are responsive to the query; and execute the sequence of decoration nodes on the query result set, wherein each of the decoration nodes modifies the query result set, thereby producing a decorated result set based on the query result set and the one or more decoration nodes, wherein producing the decorated result set comprises associating one or more members or values in the query results with a corresponding position or a calculated member in the report specification.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
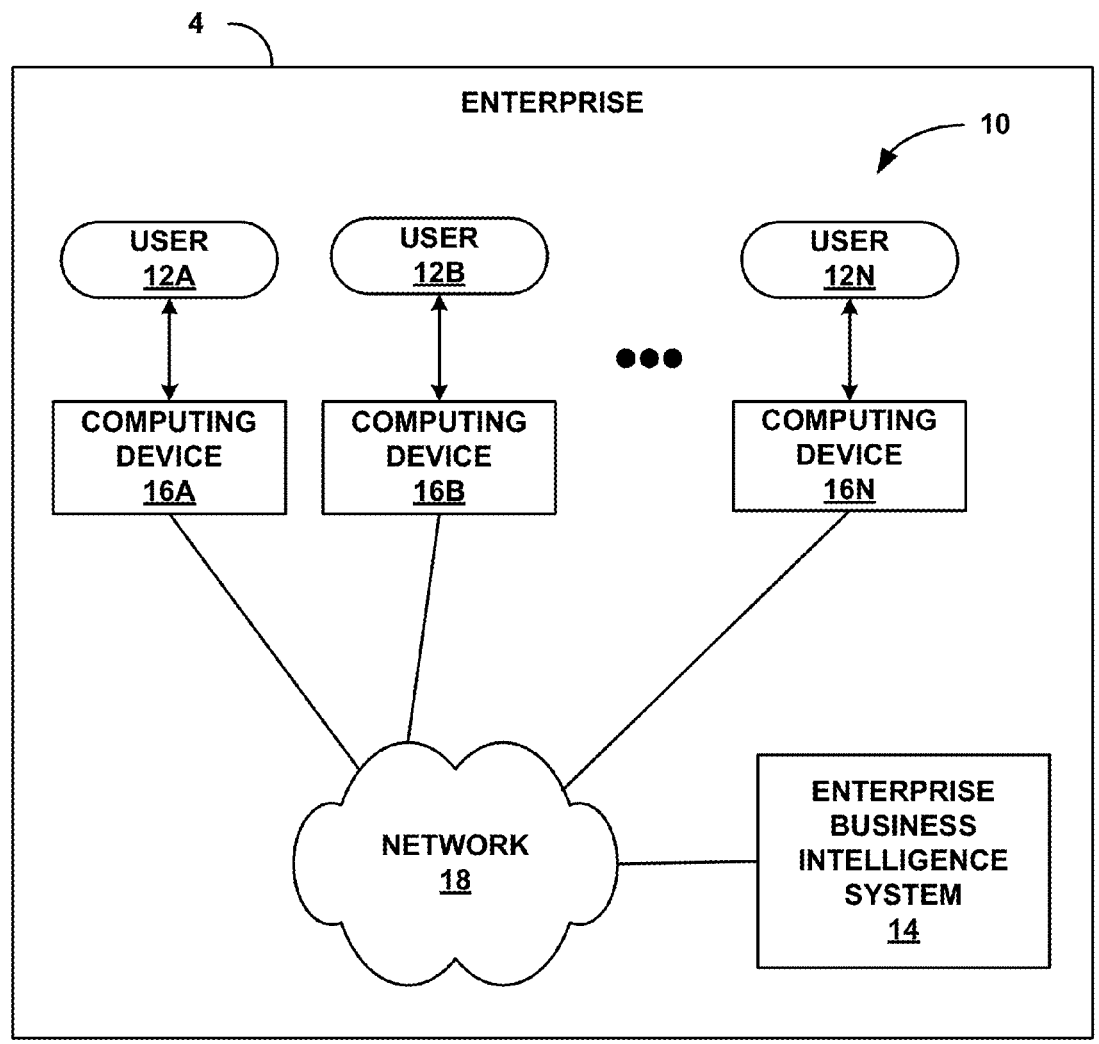
FIG. 1 is a block diagram illustrating an example enterprise having a computing environment in which a plurality of users interacts with an enterprise business intelligence system.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") interact with an enterprise business intelligence system 14. In the system shown in FIG. 1, enterprise business intelligence system 14 is communicatively coupled to a number of computing devices 16A-16N (collectively, "computing devices 16") by a network 18. Users 12 interact with their respective computing devices to access enterprise business intelligence system 14.

For exemplary purposes, one example of the techniques of this disclosure is described in reference to an enterprise business intelligence system, such as an enterprise financial or budget planning system. The techniques described herein may be readily applied to other software systems, including other large-scale enterprise software systems. Examples of enterprise software systems include order management systems, inventory management systems, sales force management systems, business intelligence tools, enterprise reporting tools, project and resource management systems, and other enterprise software systems.

Typically, users 12 view and manipulate multidimensional data via their respective computing devices 16. The data is "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to interact with enterprise business intelligence system 14 via network 18. For example, an enterprise user 12 may interact with enterprise business intelligence system 14 using a laptop computer, desktop computer, or the like, running a web browser, such as Internet Explorer™ from Microsoft Corporation of Redmond, Wash. Alternatively, an enterprise user may use a smartphone, such as a phone running the Android™ operating system from Google, Inc. of Mountain View, Calif., an iPhone™ from Apple Inc. of Cupertino, Calif., or similar device, running either a web browser or a dedicated smartphone application for interacting with enterprise business intelligence system 14.

Network 18 represents any communication network, such as a packet-based digital network like a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
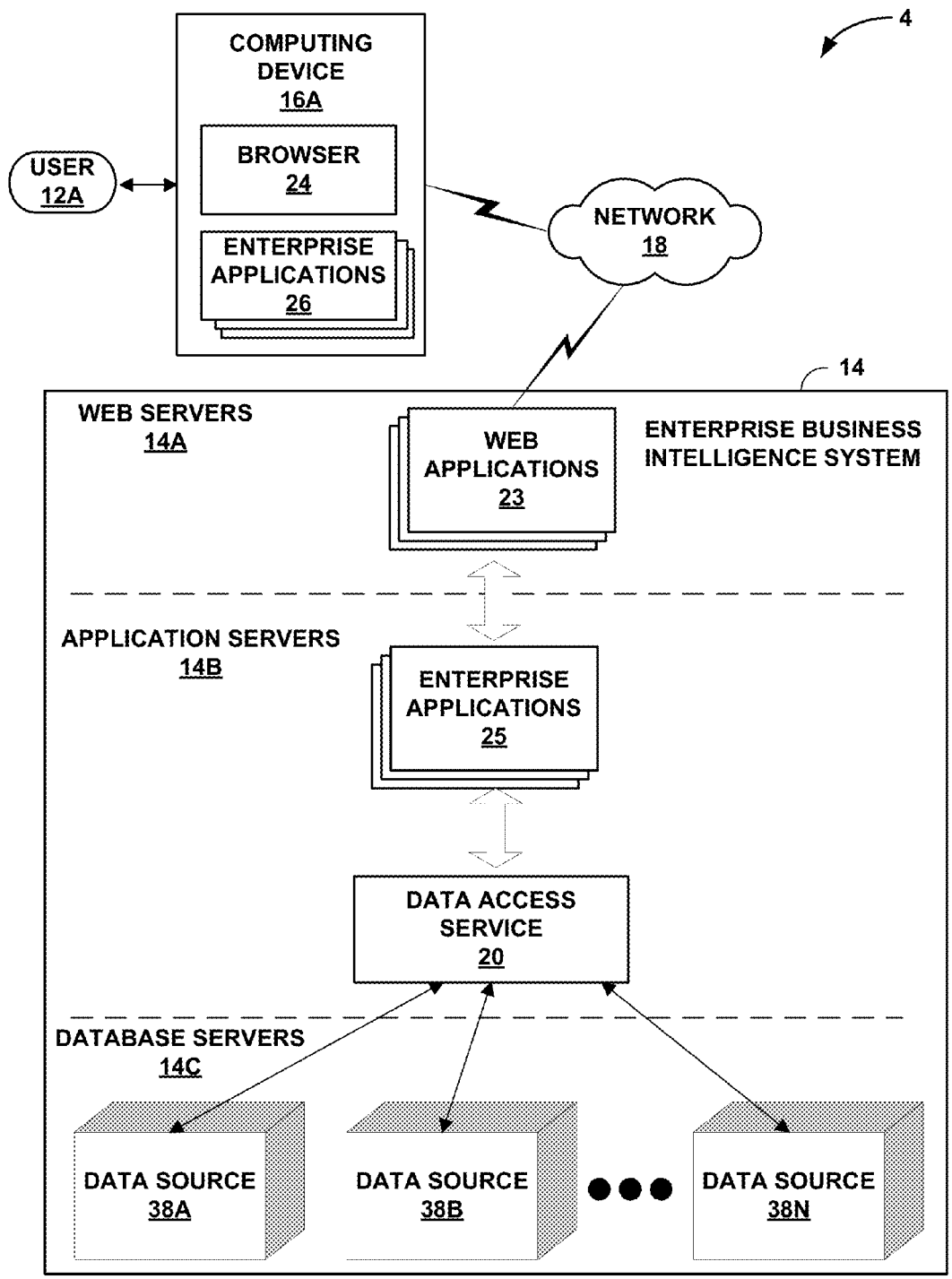
FIG. 2 is a block diagram illustrating one embodiment of an enterprise business intelligence system.

In one example implementation, as depicted in FIG. 2, enterprise business intelligence system 14 is implemented in accordance with a three-tier architecture: (1) one or more web servers 14A that provide user interface functions; (2) one or more application servers 14B that provide an operating environment for enterprise software applications and business logic; (3) and one or more data sources 14C. The data sources 14C may include two-dimensional databases and/or multidimensional databases, i.e. cubes. The data sources may be implemented using a variety of vendor platforms, and may be distributed throughout the enterprise. As one example, the data sources 14C may be multidimensional databases configured for Online Analytical Processing (OLAP). As another example, the data sources 14C may be multidimensional databases configured to receive and execute Multidimensional Expression (MDX) queries of some arbitrary level of complexity. As yet another example, the data sources 14C may be two-dimensional relational databases configured to receive and execute SQL queries, also with an arbitrary level of complexity. Such complex queries may be formulated such that the data source result set contains report-level semantics and/or layout information in the layout of the data itself.

As described in further detail below, the enterprise software applications issue complex business queries. Enterprise business intelligence system 14 includes a data access service that provides a logical interface to the data sources 14C. The data access service may, for example, parse the business queries from the enterprise software applications and execute queries according to a structured query language, such as a multidimensional query language such as MDX or a relational database query language such as SQL on the application servers intermediate to the software applications and the underlying data sources 14C. The data access service permits the enterprise software applications to issue complex MDX queries to multidimensional data sources and complex SQL queries to relational database data sources. The data access service enables the underlying data sources to perform MDX or SQL functions that they support, for example, and retrieve a query result set from the underlying data sources.

The data access service parses a business query and converts it into a run tree, which is an execution plan, and a matching collection of decoration nodes. The run tree is a tree structure that includes various types of executable nodes, including a sequence of executable decoration nodes that includes one or more executable decoration nodes. The data access service then executes the run tree, including the decoration nodes, on an underlying data source. These decoration nodes transform, modify, or simplify the query result set returned from the data source. The data access service also maintains a set of decoration rules, and each of the decoration nodes may implement one or more of the decoration rules for a query result set. Some, though not necessarily all, of the decoration nodes process decorations according to these decoration rules, where each of the decoration nodes may implement one or more of the decoration rules. The decoration nodes execute on the query result set one after another in a well-defined sequence specific to the query being processed, until the decoration processes are completed, resulting in a decorated query result set that transforms the query result set from the form in which it was received from the underlying data source, into a simplified, uniform structure and format that is optimized for rendering into a report, or for performing additional report application-level operations on as part of creating a finalized report, ensuring that the query result set is in a structure and format that the report application understands and can perform further operations on without error. The decoration rules and decoration nodes may be used to extract semantic and/or layout information from a complex query result set, apply the information as decorations or metadata to the data values within the result set, and transform the result set layout into a standard list or cross tabular format. The data service with decoration nodes and decoration rules thereby acts as a central coordinator to ensure that both the underlying data source and the overarching reporting applications are able to carry out all of their own processing capabilities in data that is structured and formatted ideally at each level.

FIG. 2 is a block diagram illustrating in further detail portions of one embodiment of an enterprise business intelligence system 14. In this example implementation, a single client computing device 16A is shown for purposes of example and includes a web browser 24 and one or more client-side enterprise software applications 26 that utilize and manipulate multidimensional data.

Enterprise business intelligence system 14 includes one or more web servers that provide an operating environment for web applications 23 that provide user interface functions to user 12A and computer device 16A. One or more application servers provide an operating environment for enterprise software applications 25 that implement a business logic tier for the software system. In addition, one or more database servers provide multidimensional data sources 38A-38N (collectively "data sources 38"). The multidimensional data sources may be implemented using a variety of vendor platforms, and may be distributed throughout the enterprise.

Multidimensional data sources 38 represent data sources which store information organized in multiple dimensions. Data on data sources 38 may be represented by a "data cube," a data organization structure capable of storing data logically in multiple dimensions, potentially in excess of three dimensions. In some embodiments, these data sources may be databases configured for Online Analytical Processing ("OLAP"). In some other embodiments, these data sources may be vendor-supplied multidimensional databases having MDX processing engines configured to receive and execute MDX queries.

As shown in FIG. 2, data access service 20 provides an interface to the multidimensional data sources 38. Data access service 20 exposes a consistent, rich set of MDX functions to server-side enterprise applications 25 and/or client-side enterprise applications 26 for each of multidimensional data sources 38 regardless of the specific MDX functions implemented by the particular data source as well as any vendor-specific characteristics or differences between the data sources.

That is, data access service 20 receives MDX query specifications from enterprise applications 25, 26 targeting one or more multidimensional data sources 38. User 12A, for example, may interact with enterprise applications 25, 26 to formulate a report and define a query specification, which in turn results in enterprise applications 25, 26 generating one or more MDX queries. Data access service 20 receives the queries and, for each query, decomposes the query into a plurality of constituent components, referred to as query run-tree nodes. For each query run-tree node, data access server 20 determines whether to direct the query run-tree node to the target multidimensional data source for remote execution or whether to emulate the function(s) by retrieving the necessary data from the target data source and performing the specified function(s) locally, e.g., on the application servers and within the process space of the data access service.

Data access service 20 may make this determination based on a variety of factors, including: (1) the vendor-specific characteristics of data sources 38, (2) the particular MDX features implemented by the MDX query processing engines of each of the data sources, (3) characteristics of the execution unit within each run-tree node of the query, such as amount of data necessary to perform the operation, and (4) current condition with the compute environment, such as network loading, memory conditions, number of current users, and the like. In this manner, data access service 20 permits the enterprise software applications 25 or 26 to issue complex MDX queries to multidimensional data sources or complex SQL queries to relational databases among data sources 38. As a result, user 12A may interact with enterprise software applications 25, 26 to create reports and provide query specifications that utilize the full, rich features of the query language, such as MDX or SQL.

Figure 3:
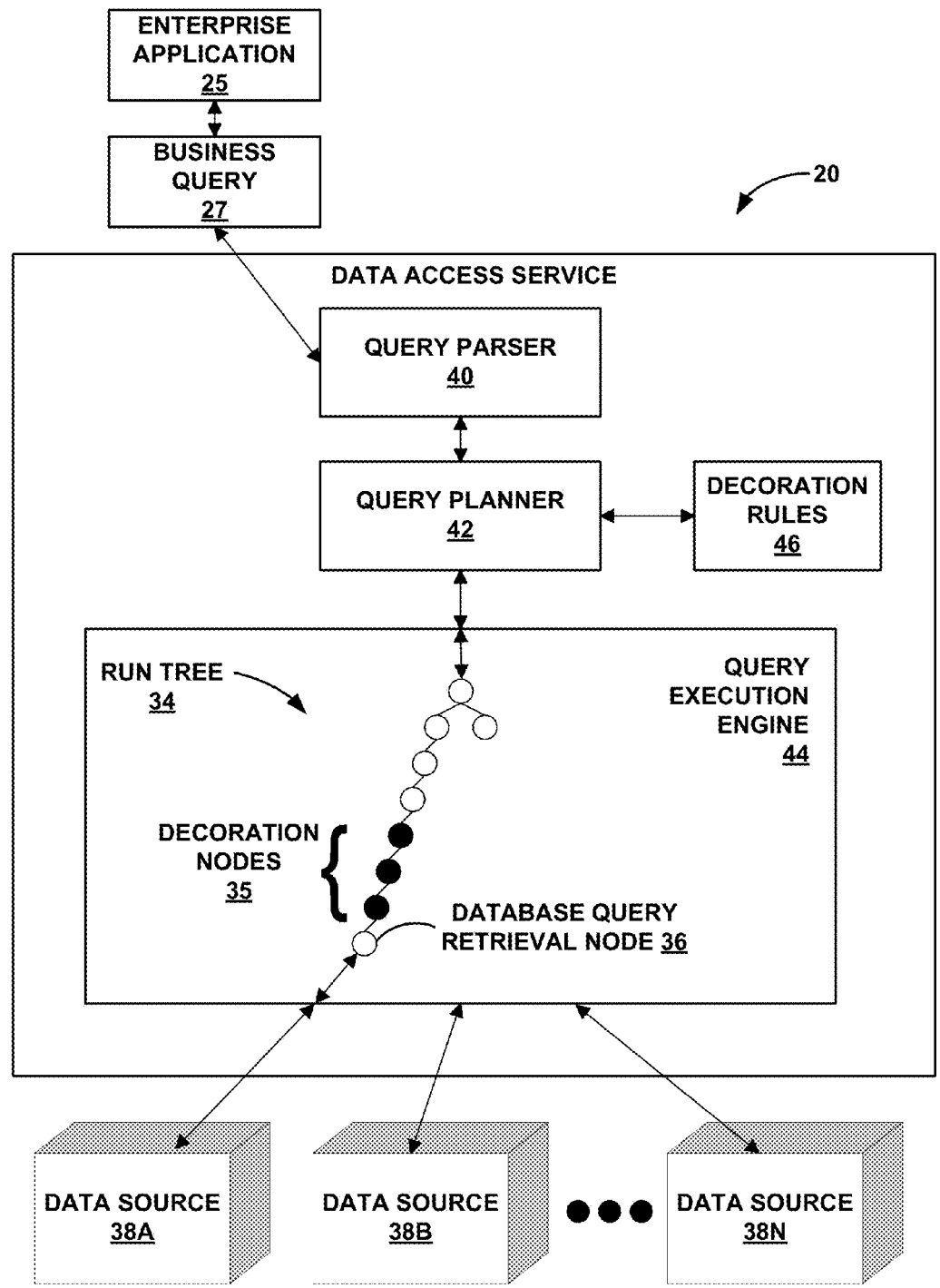
FIG. 3 illustrates in further detail an example embodiment of data access service that provides a logical interface to a plurality of data sources.

FIG. 3 illustrates in further detail an example embodiment of data access service 20. In this example embodiment, data access service 20 comprises query parser 40, query planner 42, query execution engine 44, and decoration rules 46. Query execution engine 44 performs queries of any number of external data sources 38A-38N (data sources 38). Any of query parser 40, query planner 42, query execution engine 44, and decoration rules 46 may be specialized for using one or more types of querying tools on a particular type of data source, such as MDX queries of a multidimensional data cube, SQL queries on a relational database, or other querying tools for other types of data sources. In one example, the decoration rules 46 are enabled to apply to any of a variety of query types and data sources, including MDX queries of cubes and SQL queries of relational databases. The query parser 40, query planner 42, and query execution engine 44 may be enabled to work with multiple query types and multiple types of data sources. For example, data access service 20 may receive business queries that it responds to by issuing queries to one or more data sources, and creating a run tree 34 that includes a particular sequence of decoration nodes 35 to process data from a data source 38A, with a particular run tree created for processing a particular data source from among data sources 38.

In various implementations, data access service 20 may also include additional components such as a metadata repository, a multidimensional calculation engine, a multidimensional data cache, or other components (not depicted in FIG. 3). Data access server 20 may provide a generic interface between user 12A, particularly computing device 16A, and data sources 38. Data access server 20 may run on the server level, the application level, or as its own intermediate level.

Query parser 40 represents a parsing application within enterprise business intelligence system 14. In general, query parser 40 parses a received business query into constituted execution units to produce a binary representation of the query in the form of a parse tree. Each node in the parse tree represents one of the discrete query execution units and specifies the function(s) associated with the node and any required query elements.

Query planner 42 processes each node of the parse tree and identifies all known query functions and elements, i.e., those query elements that the planner recognizes with respect to the underlying data sources. During this process, query planner 42 may rearrange the nodes of the parse tree to change their execution order or even remove unnecessary nodes to improve the performance of the query, such as to increase execution speed, and reduce the amount of data communicated over the enterprise network by taking advantage of cached data. Once processed by query planner 42, the resultant binary structure is referred to as a run tree 34, which is a query execution plan. Query planner 42 also adds one or more decoration nodes 35 to the run tree 34. Decoration nodes 35 are executable run tree nodes that may each apply one or more of decoration rules 46 to a query result set. Within run tree 34, each node is of a specific type, and during the planning process query planner 42 provides each node with whatever information it requires to process the data that flows into it (e.g., data defining the decoration rules assigned to a decoration node 35). Query planner 42 may assign one or more of decoration rules 46 to each of the decoration nodes 35 in the run tree 34.

Query execution engine 44 represents an execution engine application within enterprise business intelligence system 14. Query execution engine 44 receives the run tree 34 from query planner 42 and executes the run tree. During the execution of run tree 34, which starts at the top and then descends to a leaf data node, the data flows up the tree from database query retrieval node 36. In the course of doing so, one or more decoration nodes 35 process the data to transform the query result set from data source 38A into a decorated, or normalized, result set.

Query execution engine 44 interacts with data sources 38 to issue queries and direct a particular data source 38A, for example, to execute the functions associated with nodes of a run tree 34 designated for execution on that data source 38A. Query execution engine 44 may issue structured MDX queries to one of data sources 38 according to operations defined by the nodes of the run tree 34. Data source 38A remotely applies operations on the data and returns one or more result sets. Query execution engine 44 produces a query result set that is processed in accordance with the nodes of run tree 34, including the decoration nodes 35.

Decoration nodes 35 may each execute one or more different types of decorations on the query result set returned from data source 38A. Each of decoration nodes 35 may execute or implement one of decoration rules 46 on the result set, in accordance with associations of decoration rules 46 with decoration nodes 35 as determined by query planner 42, to transform or modify the result set in a pre-defined and consistent manner. Decoration rules 46 may retrieve relevant information from query planner 42 determines the relevant order of decoration rules 46 among decoration nodes 35 before providing run tree to query execution engine 44 to facilitate in preparing a particular set of decoration rules appropriate for the particular query result set. After run tree 34 completes its sequence of executing decorations on the query result set, transforming or simplifying the structure and/or format of the query result set, data access service 20 provides the decorated query result set to the requesting enterprise software applications 25, 26. The decorated query result set is in a form that facilitates any further processing or rendering that may be done at the level of the requesting enterprise software applications 25, 26. The processes performed by data access service 20 are further described below with reference to FIG. 5.

Certain advantages and areas of novelty of a data access service 20 that uses a query planner 42 that creates run trees 34 with decoration nodes 35 that apply decoration rules 46 may be highlighted by comparison with systems that do not use query result decorations. The processing of the data returned by either relational or OLAP queries, typically expressed in SQL and MDX, respectively, which are beyond the simple "data drain" variety, in the past has been performed by applying one or more layout and/or computational rules/directives to the data as returned by the data source prior to being laid out in accordance with the associated report/analysis specification. The execution of an individual report or analysis by BI tools may be achieved in one of the following manners. In one example, all data/query processing is performed by the underlying data source, such as either a relational database management system (RDBMS) or an online analytic processing (OLAP) database. In another example, the underlying/detail data is retrieved from the underlying data source and all additional processing (e.g. data filters or computation of report summaries), notably the application of logic not supported by the underlying data source, is computed by the BI tool. In a third example, much of the query processing is "pushed" to the underlying data source, and any remaining BI tool specific operations are performed by the BI tool.

In one example, all of the query processing is performed by the database system in which the data is contained, without the need for any additional query or result set processing in the BI server. The benefit of this approach is that this is in most cases the most efficient way of executing a query, making use of the hardware on which databases reside, as well as reducing the amount of data transferred between the database and the BI server. However, the functionality of BI reports and analyses in this case are restricted to the capabilities of the underlying database since no BI semantics are applied to the results of the query execution.

In another example, the data retrieved from the underlying data source is returned to the BI tool in a relatively simple/ basis format (either a homogeneous tabular result or cross tabular result) that can be easily processed by the BI tool's own computation/manipulation/layout components. In this scenario, the underlying database processing capabilities are underutilized since data processing is primarily performed by the BI tool. The data processing of the BI tool is simplified, though, due to the simplicity of the format in which the data is obtained.

A third example is to combine the previous two, and push much of the query semantics/processing to the underlying database for execution while performing any remaining BI semantic processing within the BI server. In this approach, the manner in which the data is organized upon its return from the database system is difficult to render into the desired report layout and is difficult upon which to perform additional report semantics/processing. This is further described below with reference to FIG. 4.

Applying decoration rules and executing decorations on query results, including based on decoration rules, combines the advantages of all three of the examples above, among other advantages. Executing decorations on query results allows a Business Intelligence system to take full advantage of the native query processing of any underlying data sources, and render the processed query results from the underlying data sources into a decorated result set that is ideal for performing any additional report level operations and for a report layout, as is further described below with reference to FIG. 5.

Figure 4:
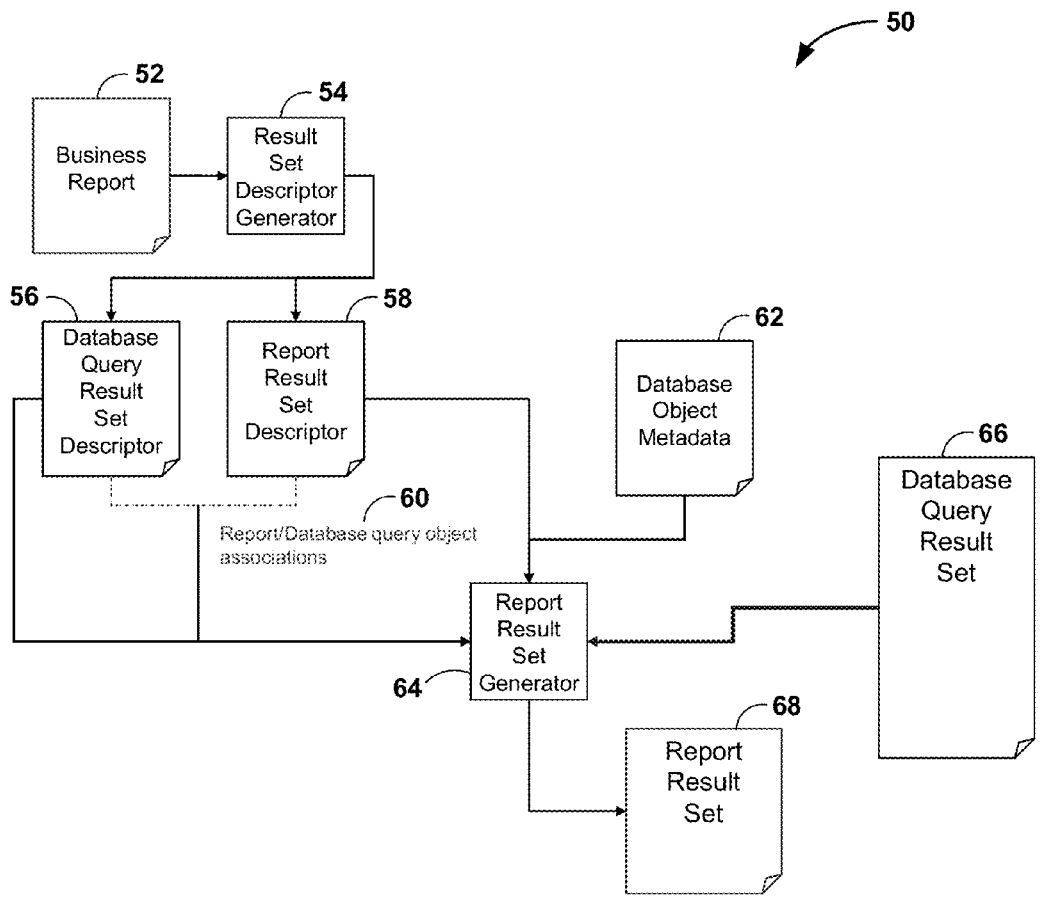
FIG. 4 depicts a process by which a database query result set may be converted into an original report specification.

FIG. 4 depicts a process 50 by which a database query result set is converted into a business report 68, without using decoration nodes or decoration rules. This approach can be summarized as follows. First, result set descriptor generator 54 constructs original report specification result set descriptors 56 and obtains database query result set descriptors 58 (i.e. metadata describing the layout/structure of the data returned in a result set). Second, report/database query object associations 60 between the objects in the report and database query result set descriptors are constructed. Third, database object metadata 62 describing the objects in the database (e.g. dimensions, hierarchies, tables) is obtained and associated with the objects in the database query result set descriptor 56. Fourth, this information is used by a report result set generator 64 to convert the database query result set 66 into the layout specified by the report layout. This generator 64 walks the data in the database query result set 66 in a depth-first manner, placing objects/values on a stack until it determines that it has encountered all of the items necessary to produce a row of data—be it a detail, grouping, or summary row of data, finally producing report result set 68.

One of the difficulties with this approach is that report semantics/operations which cannot be applied in the underlying SQL or MDX query must be applied directly to the query results themselves, but the complexity of the queries posed to the underlying database typically means that the query results are in a format not easily manipulated because of things such as the presence of MDX calculated members used to separate groups of members within a single dimension, the presence of MDX calculated members to compute business report summaries, and the presence of ragged/unbalanced paths in a set of members representing a hierarchical path within a dimension. The application of report processing/semantics to the database query result set 66 can modify the structure of the data such that the report result set generator 64 creates an invalid output because the relationships in the original data are lost or broken.

Figure 5:
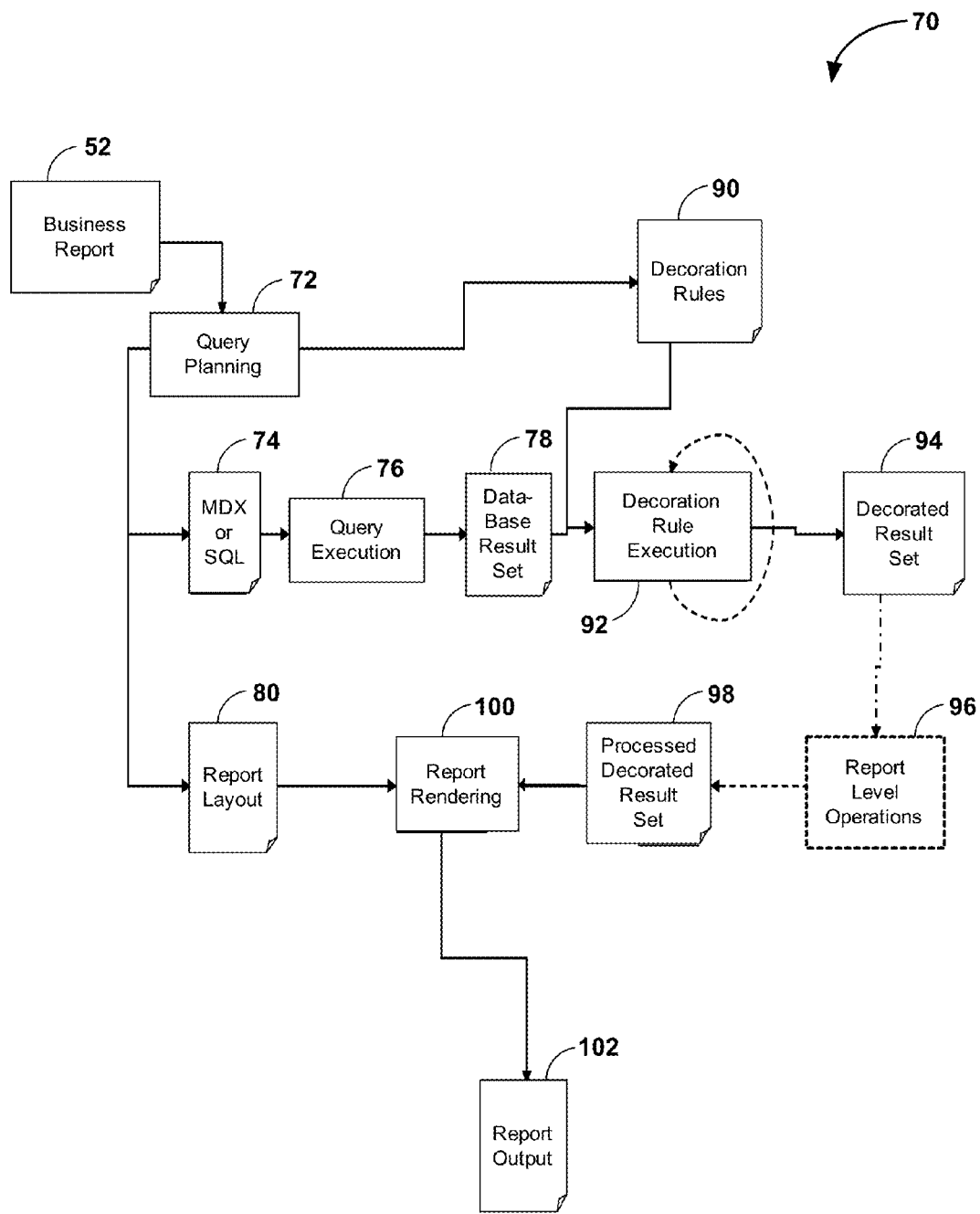
FIG. 5 illustrates an example process performed by a data access service using decoration nodes to convert a data query result into the layout of an original report specification.

Systems and methods disclosed herein, such as in the example of FIG. 5, address these problems by facilitating the application of business report semantics to an arbitrarily complex database result set. This may be achieved, for example, by adding business report information to a database query result set in an iterative fashion using distinct decoration rules and modifying the data's layout to allow it to be easily manipulated by business report constructs.

The use of distinct result set decoration nodes, and the application of one or more related decoration rules at a time, provides for a more maintainable and adaptive system. The series of decoration rules applied to a result set can be described in text or by the use of visual icons in a graphical user interface, allowing for better understanding of the entire transformation process. Finally, the ability to produce a result set upon which business rules/semantics may be applied prior to rendering the final report output provides distinct advantages and improvements over existing technology.

illustrates an example process performed by a data access service using decoration nodes to convert a data query result into the layout of an original report specification.

FIG. 5 illustrates in further detail an example process 70 performed by a data access service 20 of this disclosure, using decoration nodes 92 to convert a data query result set 78 into the layout of an original report specification 52. This example embodiment includes the process of defining decoration rules 90 and applying a decoration rule execution process 92 that executes one or more decoration rules on database query result set 78, thereby transforming database query result set 78 to produce a generic tabular or cross tabular decorated result set 94 upon which report-level operations/semantics 96 may be applied. Decoration rule execution process 92 may use decoration nodes, where each decoration node is configured to execute one or more decoration rules on query result set 78, so that the query result set is transformed one decoration at a time before being finalized as decorated result set 94. These transformations may restructure the database query result set 78 by converting relationships and metadata in the result set 78 into metadata associated with members or values in the result set, thereby collapsing the original result set 78 into a decorated result set 94, which has a format which can be easily manipulated by report-level constructs, such as suppression of rows or columns only containing zero and/or null values, for report rendering 100 and report output 102. Each database result set 78, by application of one or more decoration rules generated during the formulation of the query, is manipulated such that the end result is a decorated result set 94 that can either be rendered through report rendering 100 as a report output 102, or serve as the basis for additional report level operations 96 to generate a further processed decorated result set 98 that is then rendered through report rendering 100 as a report output 102. The resulting report output 102 may involve layout and semantic information imposed on the underlying data to achieve things such as headers and footers (summary values), grouping and nesting relationships, filters, sorting, suppression of rows or columns only containing zero and/or null values, additional report/analytic computations, for example.

In this example, each result set processing rule, i.e. decoration rule, is applied by a processing node, i.e. decoration node, such that the result set flows from one decoration node to another until the final decoration node produces the completed decorated result set 94. This process can be analogized to a production line, where each decoration node can be thought of as a worker on a production line that adds to the final product. This production line behaves like the overall decoration design pattern, therefore each processing node can also be referred to as a decoration node. The chain of these decoration nodes converts a database query result set 78 to a decorated result set 94. The intermediate result set produced by each decoration node is consumed by the next decoration node, during decoration rule execution process 92. After the application of the final decoration node, the fully decorated result set 94 is produced.

In one particular example, a simple multi-axis OLAP query result can be decomposed to the following two problems: the assignment of report layout information is broken down so that each axis of the result is handled independently, and the re-computation of cell ordinals due to changes of members on an axis. Each decoration node may be further broken down such that a set of decoration rules 90 describes the work to be done by each decoration node. These decoration rules 90 are defined so that each tuple in the result can be resolved to a single decoration rule to ensure there is no ambiguity in the interpretation of the query result. This allows for consistent and predictable rendering of a report's output.

The example process 70 depicted in FIG. 5, running in enterprise business intelligence system 14 as depicted in FIGS. 1-3, therefore includes receiving, with data access service 20, a query and a report specification 52 from an enterprise software application 25, wherein data access service 70 is positioned between the enterprise software application 25 and one or more data sources 38. Example process 70 further includes executing the query on the one or more data sources 38, thereby providing a query result set 78 comprising query results drawn from the one or more data sources 38 that are responsive to the query. Example process 70 further includes executing a sequence of decoration nodes 92 on the query result set 78, wherein each of the decoration nodes 92 modifies the query result set 78, thereby producing a decorated result set 94 based on the query result set 78 and the one or more decoration nodes 92. Producing the decorated result set 94 includes associating each of one or more members or values in the query results 78 with a corresponding position or a calculated member in the report specification.

Figure 6:
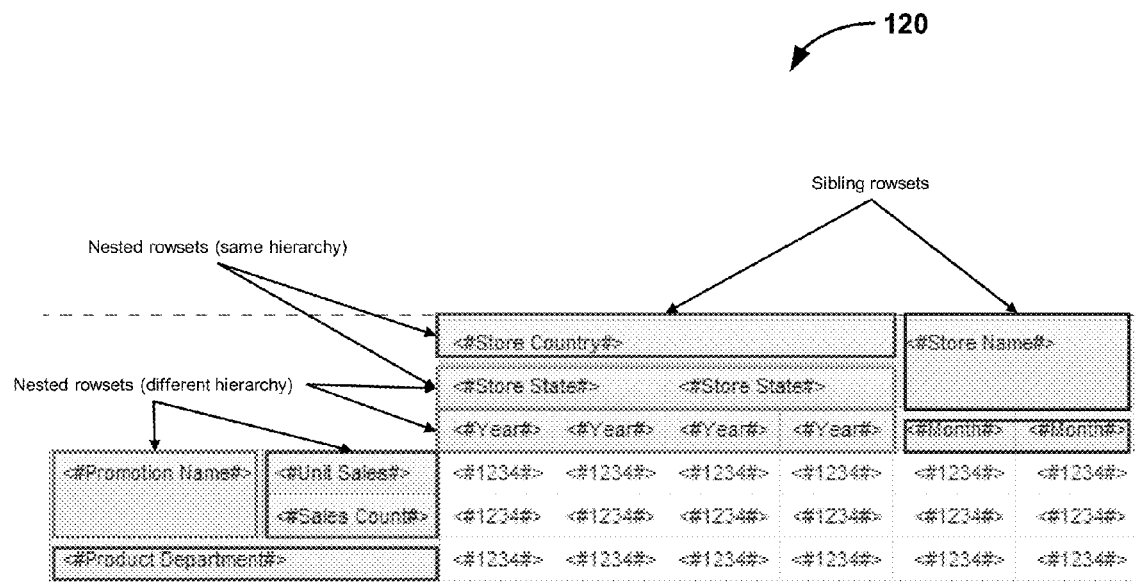
FIG. 6 depicts an example business intelligence query specification.

FIG. 6 depicts an example BI query specification 120. In this example, an engine/process is provided with a BI query specification 120 in XML that contains one or more query items that are laid out in either a tabular or cross tab format. Each query item is one of the following: 1. A column in a relational table; 2. A member in a dimension; 3. A single dimension set expression; 4. A hierarchy (equates to all members of the hierarchy); 5. A level (equates to all members of the level); 6. A dimensional member property (value of the property for the associated member in the same row); 7. A measure; or 8. A set or value expression.

The query items are themselves contained in one or more rowsets. Each rowset is an ordered collection of one or more query items. Query items within a rowset may be optionally identified as grouping columns which define the aggregation of measure/value query items in the rowset. The rowsets are in turn organized to construct either a tabular or cross tab report.

A tabular report at its most basic contains a single rowset, but may also contain additional rowsets to represent report/section/group headers or footers. Likewise, cross tab reports have edges which are constructed from one or more nested and/or sibling rowsets along with sectioning rowsets. Thus, each query item is associated with a particular position within a specific rowset.

Referring again to FIG. 5, in the course of generating one or more SQL and/or MDX queries 74 which together provide the data necessary to populate the final report, query planner 72 converts original report constructs from business report 52 into equivalent (or nearly equivalent) SQL or MDX query constructs 74, along with processing directives required to modify the database output into a "simple" output format—either a tabular result set with a homogenous collection of rows, or a cross tab result set with a homogeneous collection of tuples along each edge of the cross tab in which each tuple contains a single member from each dimension projected along the edge of the cross tab.

The original output of the result set 78 is constructed in such a manner that it is possible to infer how each member or value within the result set 78 relates to the query items in the original rowsets of the business report 52. Each processing directive in the decoration rule execution process 92 converts one part of the database query result set 78 closer to a "simple" output format and as it does so, assigns business report semantics (rowset and query item position within the rowset) to each member or value in the result set.

Once all of the processing directives in the decoration rule execution process 92 have been applied to the database result set, the data is such that it is laid out in a "simple" form, but one in which each value/member has been assigned its position within a particular rowset within the report layout. The application of each processing directive must ensure that it does not modify the result set in such a manner as to invalidate any remaining processing directives to be applied. This does not imply that processing directives are not non-destructive to other directives, but that the order in which the processing directives are applied must take into account the impact of one directive upon all other directives.

Once all the query processing directives have been applied, it is then possible to either apply the data to the report layout based on the embedded rowset/query item information, or apply business report manipulations on the data (such as suppression in the context of a report).

As decoration rules are applied and the result set is "collapsed", metadata is assigned to the members along an axis. This is performed by adding context metadata to each member. The context metadata may include the identification of the business report rowset to which a member is associated, the identification of the member's position in the business report rowset, and optionally, a reference to a higher-level member that is also projected in the final report, in which a member is nested. This context member is also assigned its own context information, which may include its own context member.

Once the edges of a cross tab have been transformed into the final business report format, it is necessary when retrieving cell values to recompute cell ordinal values—the original cell ordinals correspond to the members as they appear in the original result and must be recomputed taking into account the manipulations to the edge members.

Referring again to FIG. 5, a decoration node applies one or more decoration rules 90 to a result set 78. The output of the application of a decoration node, after one or more decoration rule execution process 92, is a modified result set 94. The output of the final decoration node is a business report result set 94 to which business report semantic operations 96 may be applied or which may be rendered 100 in the format of the original report layout 80 to produce report output 102. A decoration node applies decoration rules to one hierarchy on a single axis on a result set 78. Thus, in this example, at a minimum, there must be a decoration node for each hierarchy in a result set 78. In this example, the following rules apply: 1. The result set must be decorated starting with the axis with the lowest ordinal number. In other words, all hierarchies on axis 0 must be decorated before axis 1 and so on. 2. Hierarchies on an axis must be decorated from the outermost hierarchy to the innermost. For a given tuple, the member at position 0 (outermost hierarchy) must be decorated before position 1.

In this example, no state information regarding the result is stored within a decoration node, though state can be maintained with the iterator associated with a decoration node. An execution context may maintain its own independent state.

In a particular example focused on multidimensional databases configured for Online Analytical Processing (OLAP), a data access process 70 uses OLAP decoration rules and decoration nodes. In this example, the OLAP decoration nodes and OLAP decoration rules have certain mandatory properties. For the OLAP decoration nodes, the mandatory properties include: 1. Edge ordinal. This instructs the decoration node to which edge the decoration is to be applied. 2. Tuple position. This is the position of the hierarchy within the edge tuple (identifying the hierarchy to which a decoration node is applied). 3. One or more OLAP decoration rules. Each of these decoration rules provides a decoration node with the specifics of the decoration(s) to be performed. The mandatory properties for the OLAP decoration rules include: 1. Business report rowset. This instructs the decoration to which business report rowset the members affected by this decoration rule are to be assigned. 2. Data item index. The position within the business report rowset to which the member is associated.

A variety of different OLAP decoration rules and decoration nodes are described as follows.

OLAP decoration nodes may include hierarchy decoration nodes and set decoration nodes. A hierarchy decoration node assigns all members in a hierarchy with the information from the decoration rule. In this example, a hierarchy decoration node has one prerequisite: it must have one assigned hierarchy decoration rule, unless the set contains only calculated members, in which case it must contain at least one query calculation rule.

A set decoration node is the most commonly used decoration that decorates a set consisting of an arbitrary set of members from a single hierarchy. It is also the most complex decoration. It handles arbitrary nested, sibling, or nesting sibling sets as well as supporting ragged and unbalanced hierarchies. Each decoration rule represents a rowset that members from the result must belong to. The basic structure of a set decoration node is a series of "nesting" objects. Each "nesting" object represents a level of nested sets. At each "nesting", there exist decoration rules that are sibling sets of a particular level of nesting. For each "nesting", the iterator for the axis being decorated manages the current rule that is "active" for that nesting. This is important as ordering of sets is necessary for sibling sets. The iterator also tracks the current depth of nesting. This is analogous to the current position in a tree while traversing a tree using depth first search.

In this example, each axis iterator from the decorated result also contains a context stack. This is a stack of members that contain business report context information. In a balanced and non-ragged hierarchy, only the innermost nested sets contain members that generate a business report detail row. For the members that generate non-detail rows, a stack must be used to store these members. The stack also contains logic to detect when to invalidate the current context based on the current rule being applied and the current nesting for the rule.

There are cases where there are more than one possible decoration rule to match a member when only considering a hierarchy at the time. In these cases, a context, such as an outer nested context, may be used to resolve these ambiguous matches. One example may include the following four sets:

H1S1|H2S3
H1S2|H2S3'

In the above four sets H1S1, H1S2, H2S3 and H2S3', the sets H1S1 and H1S2 are sibling sets from hierarchy one with H2S3 and H2S3' from hierarchy nested in H1S1 and H2S2 respectively. Since decoration nodes only decorate a hierarchy at a time, for any member in hierarchy two, it is impossible (without tagging) to determine whether the member should belong in H2S3 or H2S3' as S3 and S3' are identical sets. However, to avoid the overhead of tagging in this case, the decoration node can use the context of members in H2 to determine which nested sets the member belongs to. If the context of the member belongs in H1S1 then it must be in H2S3. Similarly, should the context be from H1S2, the member belongs in H2S3'. This logic applies for nested sibling sets within the same hierarchy.

The context stack may require additional logic to determine the correct current context. One example includes rules usage for ragged hierarchies. For example given the following nested levels and members:

Country
  City
Canada
Ottawa
Vatican

Canada is first read in the current context. Since "Country" is not the innermost nested level, it is placed on the context stack. Ottawa is the innermost nested level and thus a tuple is generated for Ottawa with Canada as its context member. When Vatican is read, if by considering the level nesting information alone, Vatican would be given the context of Canada. This obviously is incorrect and thus the parent information must be considered. In this case, the parent member is Europe which is in the "Continent" level. In this example, the "Continent" level is the one level immediately above "Country". As the parent unique name member property is always returned, the code can deduce that since the parent of Vatican is Europe, Canada cannot be the context of Vatican. This is one example of how the context for ragged hierarchies are determined.

There are cases where the parent member level is not less (in level number) than the outermost nested level and the parent member itself is not in the result. In these cases, the complete ancestry of the member needs to be fetched from the data provider before the context of the member can be deterministically resolved. If the code were to fetch the ancestry of each member individually, the performance would be inferior. Instead, the code may walk the entire axis to make a list of all members whose parent member is not in the result. The entire ancestry for all members in question can then be retrieved in one query. With all the whole ancestry of the member available, the context can be determined.

Another example includes rules usage for unbalanced hierarchies. The context stack treats all members from the non-innermost nested levels to be non-detail rows. To support unbalanced hierarchies, the context stack maintains for each member in the context stack whether the member is the context of another member. When a member is removed from the context stack and it is not the context of any member in the result, it is determined that the member belongs in a detailed row and thus must be returned as a tuple. A tuple that has already been read and displaced the member in the current context is cached so that it is not lost in the result.

Another example includes compute cell ordinal decoration. The compute cell ordinal decoration may be done by a decoration node without a decoration rule, as the final decoration performed on the query result set. This decoration may be done once to recompute the ordinals when the number of tuples on each edge has been finalized. This decoration node re-computes the cell ordinals for the cells in the query result. At this point, all axes in the query result have been decorated and all tags and filler members have been removed. The cell ordinals are remapped to be zero-based and the cell iterator translates the ordinal to the ordinals provided by the data provider.

Each axis iterator for decoration nodes keeps track of the tuple ordinal mapping. Decorations that modify the number of tuples on an axis contain a map of ordinal mappings. At any given decoration, the mapping resolves the current view of the ordinals to the original ordinal as it appears from the data source. As each decoration node is only responsible for one axis only, a request to get the tuple ordinal map for edges it does not change is delegated to the child node below if the child node is a decoration node. Otherwise, a null (identity map) is returned.

This decoration computes the cell ordinal on demand. This is done by walking the axes in the query result in turn starting at axis zero. If the cell is asked for out of order, it will fetch the cells in between the current computed cell and the requested cell. The current implementation caches all but the last axis (not including the slicer or cell axes) as well as the cells. This caching may be optimized to prevent unnecessary actions. For example, if the third axis only contain one tuple, only axis zero needs to be cached.

In this example, for the compute cell ordinal decoration, all hierarchies in all axes must already be decorated. In other words, all members in all hierarchies in the result must have a rowset and data item (except for members that are not projected). The edge ordinal and tuple position may be the edge and tuple position of the measures hierarchy. No decoration rules are required for this decoration.

Another OLAP decoration node that may be applied is a calculated member decoration node. A calculated member decoration node renames MDX calculated members with the original report names and captions. Each calculated member is represented by a rule. In this example, the calculated member decoration is applied after the member has the rowset and data item assigned but before a compute cell ordinal decoration is executed. This decoration node may use one or more calculated member decoration rules.

Another OLAP decoration node that may be applied is a remove hierarchy decoration. In an example, this decoration removes a hierarchy from an axis. This is used when calculated members are pushed to a different hierarchy to avoid the use of alternate measures. These "borrowed" hierarchies must be removed during post-processing after the calculated members are decorated in the original hierarchy. In this example, this decoration may be the last decoration for the axis. If the hierarchy is removed too early, other decoration nodes that operate on the axis could reference the wrong hierarchy. This can happen as hierarchies are referenced via the index in the member array of a tuple. This decoration does not require any decoration rules.

Another OLAP decoration node that may be applied is an empty row decoration. This decoration inserts tuples on an axis to represent empty (no data item) header/footer rows in the business report result set. For example, a sectioned report requires empty header rows to drive the creation of the section headers. Headers and footers are inserted by keeping track of the last tuple as well as reading ahead. It uses the rowset and data item on the member to detect control-breaks. For a header, it will insert the appropriate tuple for the header rowset at the beginning of a value set. In a similar fashion footers will be inserted after the last member of a value set. The empty row decoration node may use one or more empty row decoration rules.

A variety of examples of OLAP decoration rules that may be used are described as follows. In these examples, the OLAP decoration rules have the properties of a result rowset identifier and a data item index. The result rowset identifier instructs the decoration which business report result set rowset a member belongs to. The data item index is an index of the data item array the member is associated with. These general properties may apply to any of the decoration rules mentioned above with reference to the example decoration nodes and to any of the decoration rules described below, including calculated member decoration rules, empty row decoration rules, hierarchy decoration rules, hierarchy normalization rules, level decoration rules, measure decoration rules, member decoration rules, query calculation rules, and set decoration rules. Any combination of these and/or other types of decoration rules may be used in different implementations.

Calculated member decoration rules set the business report member name and caption for a given MDX member name. A business report result set rendering component consumes this information and replaces the MDX name and caption with the business report member name and caption. Calculated member decoration rules may be used with an MDX member name, i.e. the external name of the member that needs to have the business report name and caption set; a business report member name; and a business report member caption.

Empty row decoration rules specify when an empty row is to be inserted in the result. Empty row decoration rules may be used with an indicator as to whether the empty row should be inserted before or after the specified rowset and data item, in other words, whether the empty row should represent a header or a footer row. Empty row decoration rules may be used with a reference to the business report result set rowset that the empty row belongs to, the business report result set rowset that a header (or footer) may be inserted before (or after), and the data item to be used for control break. For headers, this is usually zero. The last data item is used for footers. For "regular" data items, −1 is used.

Members that represent an empty row are assigned a special, negative data item index. Context members for the empty row member provide context for the empty header/footer in the business report result set.

Hierarchy decoration rules are rules to specify that all members in the hierarchy belong in the same rowset. Hierarchy decoration rules don't require any additional information.

Hierarchy normalization rules specify the default member name for the hierarchy to be normalized, in other words, the default member name to be removed from the result. Hierarchy normalization rules may be used with the external name of the default member for the hierarchy. This decoration rule doesn't consume any other information. The default member is removed from the result set by setting its data item to a special, negative ordinal value. This is a special data item index for a business report result set rendering component to know that the member should not be returned to the caller.

Level decoration rules specify that all members that belong in the specified level belong in the rowset/data item for the rule. Level decoration rules may be used with a reference to denote which level should be matched to this rule.

Measure decoration rules specify measures in a set of measures. The measures hierarchy is treated as a special hierarchy as it controls how many cell values are copied in a tabular row. This happens when the tabular iterator is accessed from an ICubeResultSet. Measure decoration rules may be used with the tag name if tags are used. Tags are used if there exist the same measure in more than one value sets. When tags are used, all measures are to be tagged including measures that do not overlap. Measure decoration rules may also be used with a list of external unique names for each measure member in the set. This enumerates all measures in the set represented by the rule. If tagging is used, this list does not have to be populated.

There is a special case for when there is only one value set in the measures hierarchy and the measures in the value sets are unknown at planning time. In this case, no tag names or measures are set in the rule. This implies all measures in the measures hierarchy belong to the same rowset and data item. For this special case, the number of measures to construct a tabular row may be defined in different ways. In one example, there is only one measure in each of the measure decoration rules in the measure decoration node.

Member decoration rules apply rowset and data item information to a member based on the member name. This provides an optimized way to handle certain Analysis Studio reports where the result contains a few members within the same level. If the decoration uses level-based rules then each member may be tagged, as the sets will have overlapping levels. Another use for member decoration rules is to remove "filler" members in cases where the filler members are not caused by nesting of sets. In this case, the member is removed from the result set by setting the data item to a special, negative data item index. Member decoration rules may be used with the external name for the member to be decorated.

Query calculation rules handle business report query calculations. Query calculation rules may also handle calculated members that are not business report query calculations as well. Most calculated members that are not filler members or tags may be handled by this decoration rule. Query calculation rules may be used with the calculated member external name that represents the calculated member. Query calculation rules may also be used with an indication of whether or not the calculated member represents a business report summary row. This also implies that it is a business report query calculation. Query calculation rules may be used with the member index (the hierarchy) where the calculated member belongs. There are use cases where the calculated member is in a different hierarchy than the hierarchy of the members in the set. The calculated member will be copied to the right hierarchy when the member is decorated. Query calculation rules may also be used with the report name for this calculated member; the report caption for this calculated member; and an indication of whether or not this calculated member represents a report calculation.

Set decoration rules are used for assigning rowset and data item information for sets of arbitrary levels. The exception is that for members in the measures hierarchy, measure decoration rules may be used instead. If any of the sets have potential level overlap, members from the overlapping levels may have tags preceding them. Set decoration rules may be used with a set of unique level names for all levels that members in the set belong to, and the tag name used for denoting that the following members are to be in this set.

In addition to OLAP decorations, a data access service may also use other types of decorations such as relational decorations. For relational decorations, the data access service may rely on SQL queries that return a homogeneous collection of rows (not making use of SQL constructs which return heterogeneous rollup/summary rows) that contain summary values for different groupings (levels of aggregation) within the report/query. A single decoration rule may be used to describe each of the data items within the single detail rowset, zero or more grouping rowsets, and the zero or more header/footer (summary) rowsets. The detail rowset descriptor identifies the business report rowset and the relationship between database query columns and business report data items. Each header/footer rowset is identified by a business report rowset and data item that corresponds to a single column in the database result set. In addition, one or more columns in the database query result are identified which denote the grouping columns for the rowset. When the value of any of these columns changes, a row for the rowset is generated using the current value of the business report data item (column). The first row at such a control break indicates the assignment of a value to one or more corresponding columns in a grouping rowset.

Figure 7:
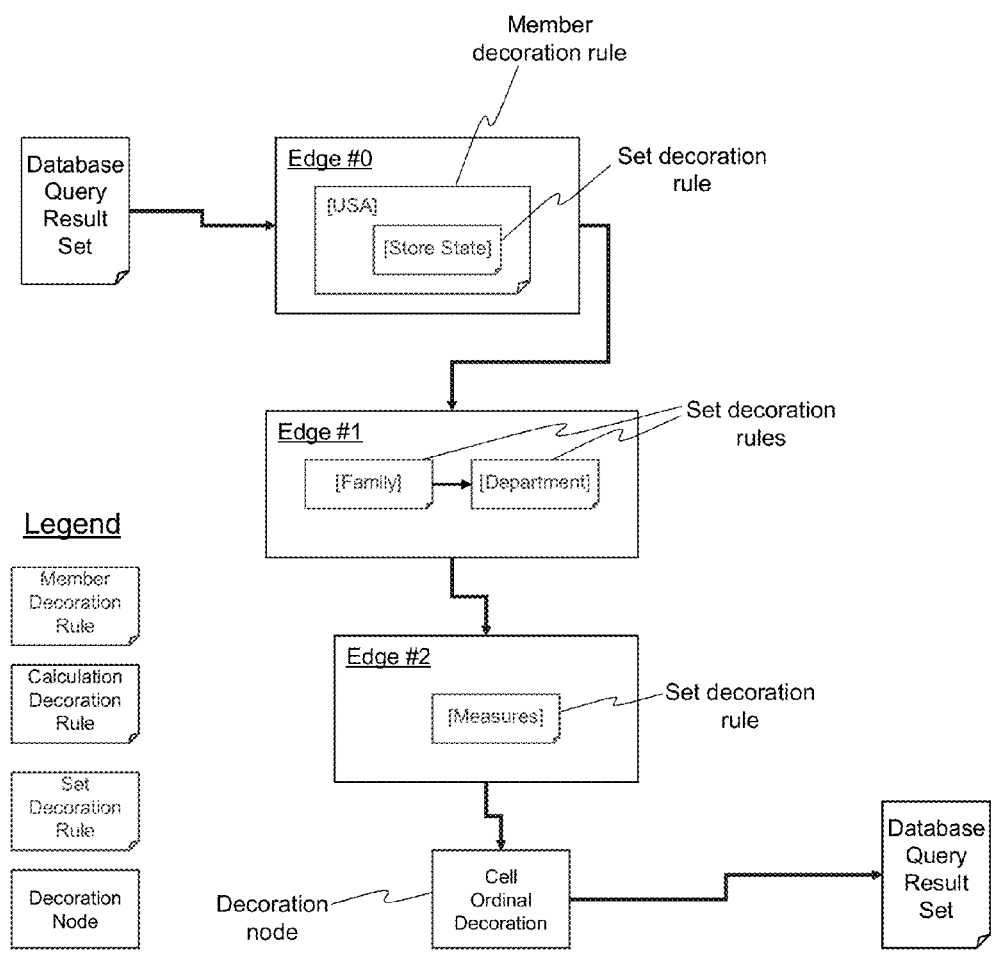
FIG. 7 depicts an example of a report output as constructed by applying set transformations to each of the edges of the report.

FIG. 7 depicts an example of a report output process 170 as constructed by applying set decorations or set transformations to each of the edges of the report. In this example, a cross tabulated report is authored as follows:

TABLE A

|  | <#USA#> | |
| --- | --- | --- |
| Unit Sales | <#Store State1#> | <#Store State1#> |
| <#Product Family#> | <#1234#> | <#1234#> |
| <#Product Department#> | <#1234#> | <#1234#> |

The measure is [Unit Sales]. Along the column (top) edge, the states are nested within the country USA. Along the row (left side) edge, the product family members (entity values) are first listed, followed by the product department members. So, members from two different levels of the same hierarchy are listed one level after another.

The report output resulting from report output process 170 appears as:

TABLE B

|  | USA | | |
| --- | --- | --- | --- |
| Unit Sales | WA | OR | CA |
| Drink | 7,102 | 6,106 | 11,389 |
| Food | 53,656 | 48,537 | 89,747 |
| Non-Consumable | 13,990 | 13,016 | 23,230 |
| Alcoholic Beverages | 1,936 | 1,680 | 3,222 |
| Beverages | 3,886 | 3,385 | 6,302 |
| Dairy | 1,280 | 1,041 | 1,865 |
| Baked Goods | 2,150 | 2,013 | 3,707 |
| Baking Goods | 5,799 | 4,810 | 9,636 |
| Breakfast Foods | 938 | 862 | 1,517 |
| Canned Foods | 5,268 | 4,889 | 8,869 |
| Canned Products | 448 | 464 | 900 |
| Deli | 3,393 | 3,038 | 5,606 |
| Eggs | 1,116 | 1,119 | 1,897 |

FIG. 7 depicts the final report output as constructed by applying the set decorations to each of the edges of the report—column, row, and corner edge, followed by the cell ordinal computation.

Figure 8:
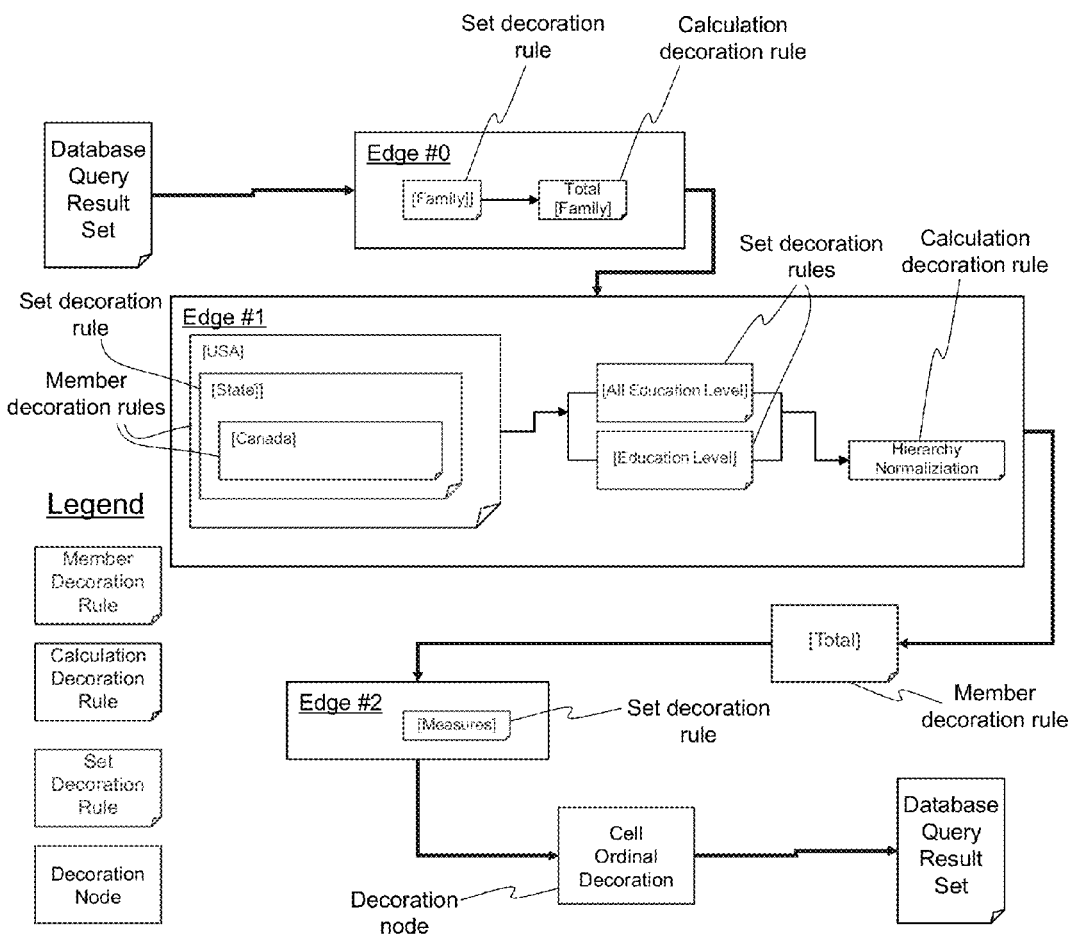
FIG. 8 depicts the final report output as constructed by applying set transformations to each of the edges of the report.

FIG. 8 depicts another example of a report output process 190, in which the column edge projects the [Product Family] members. The row edge projects two (sibling) sets, one after the other:

Customer [Education Level] nested within the Store [State] and within the country [USA].

Canada.
The cells contain the value of the [Unit Sales] measure.
The layout appears as:

TABLE C

| | Unit Sales | | <#Product Family#> | Total |
|---|---|---|---|---|
| <#USA#> | <#Store State#> | <#Education Level#> | <#1234#> | <#1234#> |
| | | <#Education Level#> | <#1234#> | <#1234#> |
| | <#Store State#> | <#Education Level#> | <#1234#> | <#1234#> |
| | | <#Education Level#> | <#1234#> | <#1234#> |
| <#Canada#> | | | <#1234#> | <#1234#> |

And the output appears as:

TABLE D

| | | Unit Sales | Drink | Food | Non-Consumable | Total |
|---|---|---|---|---|---|---|
| USA | WA | Graduate Degree | 400 | 2,980 | 794 | 4,174 |
| | | Bachelor's Degree | 1,780 | 14,356 | 3,700 | 19,836 |
| | | Partial College | 623 | 5,037 | 1,105 | 6,765 |
| | | High School Diploma | 2,048 | 15,075 | 4,008 | 21,131 |
| | | Partial High School | 2,251 | 16,208 | 4,383 | 22,842 |
| | OR | Graduate Degree | 321 | 3,241 | 767 | 4,329 |
| | | Bachelor's Degree | 1,512 | 11,210 | 3,045 | 15,767 |
| | | Partial College | 530 | 4,509 | 1,331 | 6,370 |
| | | High School Diploma | 1,828 | 14,896 | 3,978 | 20,702 |
| | | Partial High School | 1,915 | 14,681 | 3,895 | 20,491 |
| | CA | Graduate Degree | 604 | 5,034 | 1,429 | 7,067 |
| | | Bachelor's Degree | 3,131 | 23,799 | 6,306 | 33,236 |
| | | Partial College | 1,011 | 8,313 | 2,086 | 11,410 |
| | | High School Diploma | 3,350 | 26,538 | 6,943 | 36,831 |
| | | Partial High School | 3,751 | 27,242 | 7,069 | 38,062 |
| Canada | | | 5,666 | 31,415 | 10,137 | 47,218 |

FIG. 8 depicts the final report output as constructed by applying set decorations to each of the edges of the report—column, row, and corner edge, followed by the cell ordinal computation.

The original data from the MDX query posed to the database appears as something such as shown below (the data values do not match those above, but the edge members are the same):

TABLE E

| Unit Sales | | Drink | Food | Non-Consumables | XQE_V5M_CM0 |
|---|---|---|---|---|---|
| USA | XQE_FT_CM1 | ~ | ~ | ~ | ~ |
| CA | Bachelor's Degree | 2 | 3 | 4 | 50 |
| CA | Graduate Degree | 1 | 2 | 3 | 6 |
| CA | High School Degree | 2 | 3 | 4 | 9 |
| CA | Partial College | 1 | 2 | 3 | 6 |
| CA | Partial High School | 2 | 3 | 4 | 9 |
| OR | Bachelor's Degree | 1 | 2 | 3 | 6 |
| OR | Graduate Degree | 2 | 3 | 4 | 59 |
| OR | High School Degree | 1 | 2 | 3 | 6 |
| OR | Partial College | 2 | 3 | 4 | 9 |
| OR | Partial High School | 1 | 2 | 3 | 6 |
| WA | Bachelor's Degree | 2 | 3 | 4 | 9 |
| WA | Graduate Degree | 1 | 2 | 3 | 6 |
| WA | High School Degree | 2 | 3 | 4 | 60 |
| WA | Partial College | 1 | 2 | 3 | 6 |
| WA | Partial High School | 2 | 3 | 4 | 9 |
| Canada | All Education Level | 10 | 20 | 30 | 60 |

Note that in this form the data is completed undecorated. The calculated member XQE_FT_CM1 is in the result set to allow [USA] to appear as the outer level nesting member/parent of the [State] members, but its value is NULL since its value is not required for the business report. The calculated member XQE_V5M_CM0 is used to compute the row summaries.

The column edge decoration rules assign a rowset and data item identifier to each member along the edge (one rule for the product family members, another for the summary calculation), which makes it appear as follows:

TABLE F

| Unit Sales | | Drink (RS #0, DI #0) | Food (RS #0, DI #0) | Non-Consumables (RS #0, DI #0) | XQE_V5M_CM0 (RS #0, DI #0) |
|---|---|---|---|---|---|
| USA | XQE_FT_CM1 | ~ | ~ | ~ | ~ |
| CA | Bachelor's Degree | 2 | 3 | 4 | 9 |
| CA | Graduate Degree | 1 | 2 | 3 | 6 |
| CA | High School Degree | 2 | 3 | 4 | 9 |
| CA | Partial College | 1 | 2 | 3 | 6 |
| CA | Partial High School | 2 | 3 | 4 | 9 |
| OR | Bachelor's Degree | 1 | 2 | 3 | 6 |
| OR | Graduate Degree | 2 | 3 | 4 | 9 |
| OR | High School Degree | 1 | 2 | 3 | 6 |
| OR | Partial College | 2 | 3 | 4 | 9 |
| OR | Partial High School | 1 | 2 | 3 | 6 |
| WA | Bachelor's Degree | 2 | 3 | 4 | 9 |
| WA | Graduate Degree | 1 | 2 | 3 | 6 |
| WA | High School Degree | 2 | 3 | 4 | 9 |
| WA | Partial College | 1 | 2 | 3 | 6 |
| WA | Partial High School | 2 | 3 | 4 | 9 |
| Canada | All Education Level | 10 | 20 | 30 | 60 |

The row edge is decorated next, assigning rowset and data item identifiers to the members of the [Store] dimension along the row edge.

TABLE G

| Unit Sales | | Drink (RS #0, DI #0) | Food (RS #0, DI #0) | Non-Consumables (RS #0, DI #0) | XQE_V5M_CM0 (RS #0, DI #0) |
|---|---|---|---|---|---|
| USA (RS #0, DI #0) | XQE_FT_CM1 | ~ | ~ | ~ | ~ |
| CA (RS #1, DI #0) | Bachelor's Degree | 2 | 3 | 4 | 9 |
| CA (RS #1, DI #0) | Graduate Degree | 1 | 2 | 3 | 6 |
| CA (RS #1, DI #0) | High School Degree | 2 | 3 | 4 | 9 |
| CA (RS #1, DI #0) | Partial College | 1 | 2 | 3 | 6 |
| CA (RS #1, DI #0) | Partial High School | 2 | 3 | 4 | 9 |
| OR (RS #1, DI #0) | Bachelor's Degree | 1 | 2 | 3 | 6 |
| OR (RS #1, DI #0) | Graduate Degree | 2 | 3 | 4 | 9 |
| OR (RS #1, DI #0) | High School Degree | 1 | 2 | 3 | 6 |
| OR (RS #1, DI #0) | Partial College | 2 | 3 | 4 | 9 |
| OR (RS #1, DI #0) | Partial High School | 1 | 2 | 3 | 6 |
| WA (RS #1, DI #0) | Bachelor's Degree | 2 | 3 | 4 | 9 |
| WA (RS #1, DI #0) | Graduate Degree | 1 | 2 | 3 | 6 |
| WA (RS #1, DI #0) | High School Degree | 2 | 3 | 4 | 9 |
| WA (RS #1, DI #0) | Partial College | 1 | 2 | 3 | 6 |
| WA (RS #1, DI #0) | Partial High School | 2 | 3 | 4 | 9 |
| Canada (RS #2, DI #0) | All Education Level | 10 | 20 | 30 | 60 |

The next collection of decoration rules assigns rowset and data item identifiers to the members of the [Education Level] hierarchy.

TABLE H

| Unit Sales | | Drink (RS #0, DI #0) | Food (RS #0, DI #0) | Non-Consumables (RS #0, DI #0) | XQE_V5M_CM0 (RS #0, DI #0) |
|---|---|---|---|---|---|
| USA (RS #0, DI #0) | XQE_FT_CM1 | ~ | ~ | ~ | ~ |
| CA (RS #1, DI #0) | Bachelor's Degree (RS #2, DI #0) | 2 | 3 | 4 | 9 |
| CA (RS #1, DI #0) | Graduate Degree (RS #2, DI #0) | 1 | 2 | 3 | 6 |
| CA (RS #1, DI #0) | High School Degree (RS #2, DI #0) | 2 | 3 | 4 | 9 |
| CA (RS #1, DI #0) | Partial College (RS #2, DI #0) | 1 | 2 | 3 | 6 |
| CA (RS #1, DI #0) | Partial High School (RS #2, DI #0) | 2 | 3 | 4 | 9 |

TABLE H-continued

| Unit Sales | | Drink (RS #0, DI #0) | Food (RS #0, DI #0) | Non-Consumables (RS #0, DI #0) | XQE_V5M_CM0 (RS #0, DI #0) |
|---|---|---|---|---|---|
| OR (RS #1, DI #0) | Bachelor's Degree (RS #2, DI #0) | 1 | 2 | 3 | 6 |
| OR (RS #1, DI #0) | Graduate Degree (RS #2, DI #0) | 2 | 3 | 4 | 9 |
| OR (RS #1, DI #0) | High School Degree (RS #2, DI #0) | 1 | 2 | 3 | 6 |
| OR (RS #1, DI #0) | Partial College (RS #2, DI #0) | 2 | 3 | 4 | 9 |
| OR (RS #1, DI #0) | Partial High School (RS #2, DI #0) | 1 | 2 | 3 | 6 |
| WA (RS #1, DI #0) | Bachelor's Degree (RS #2, DI #0) | 2 | 3 | 4 | 9 |
| WA (RS #1, DI #0) | Graduate Degree (RS #2, DI #0) | 1 | 2 | 3 | 6 |
| WA (RS #1, DI #0) | High School Degree (RS #2, DI #0) | 2 | 3 | 4 | 9 |
| WA (RS #1, DI #0) | Partial College (RS #2, DI #0) | 1 | 2 | 3 | 6 |
| WA (RS #1, DI #0) | Partial High School (RS #2, DI #0) | 2 | 3 | 4 | 9 |
| Canada (RS #2, DI #0) | All Education Level (RS #3, DI #0) | 10 | 20 | 30 | 60 |

The next decoration rule "normalizes" the [Store] hierarchy. The [USA] member does not appear in the final report in its own row with data; it is used as context for the [State] level members. The USA members in italics in Table J, below, represent a context member that is not visible upon initial examination of the result set without querying each member for if its context members, if it has any.

TABLE J

| Unit Sales | | | Drink (RS #0, DI #0) | Food (RS #0, DI #0) | Non-Consumables (RS #0, DI #0) | XQE_V5M_CM0 (RS #0, DI #0) |
|---|---|---|---|---|---|---|
| USA (RS #0, DI #0) | CA (RS #1, DI #0) | Bachelor's Degree (RS #2, DI #0) | 2 | 3 | 4 | 9 |
| USA (RS #0, DI #0) | CA (RS #1, DI #0) | Graduate Degree (RS #2, DI #0) | 1 | 2 | 3 | 6 |
| USA (RS #0, DI #0) | CA (RS #1, DI #0) | High School Degree (RS #2, DI #0) | 2 | 3 | 4 | 9 |
| USA (RS #0, DI #0) | CA (RS #1, DI #0) | Partial College (RS #2, DI #0) | 1 | 2 | 3 | 6 |
| USA (RS #0, DI #0) | CA (RS #1, DI #0) | Partial High School (RS #2, DI #0) | 2 | 3 | 4 | 9 |
| USA (RS #0, DI #0) | OR (RS #1, DI #0) | Bachelor's Degree (RS #2, DI #0) | 1 | 2 | 3 | 6 |
| USA (RS #0, DI #0) | OR (RS #1, DI #0) | Graduate Degree (RS #2, DI #0) | 2 | 3 | 4 | 9 |
| USA (RS #0, DI #0) | OR (RS #1, DI #0) | High School Degree (RS #2, DI #0) | 1 | 2 | 3 | 6 |
| USA (RS #0, DI #0) | OR (RS #1, DI #0) | Partial College (RS #2, DI #0) | 2 | 3 | 4 | 9 |
| USA (RS #0, DI #0) | OR (RS #1, DI #0) | Partial High School (RS #2, DI #0) | 1 | 2 | 3 | 6 |
| USA (RS #0, DI #0) | WA (RS #1, DI #0) | Bachelor's Degree (RS #2, DI #0) | 2 | 3 | 4 | 9 |
| USA (RS #0, DI #0) | WA (RS #1, DI #0) | Graduate Degree (RS #2, DI #0) | 1 | 2 | 3 | 6 |
| USA (RS #0, DI #0) | WA (RS #1, DI #0) | High School Degree (RS #2, DI #0) | 2 | 3 | 4 | 9 |
| USA (RS #0, DI #0) | WA (RS #1, DI #0) | Partial College (RS #2, DI #0) | 1 | 2 | 3 | 6 |
| USA (RS #0, DI #0) | WA (RS #1, DI #0) | Partial High School (RS #2, DI #0) | 2 | 3 | 4 | 9 |
| | Canada (RS #2, DI #0) | All Education Level (RS #3, DI #0) | 10 | 20 | 30 | 60 |

The final transformation decorates the calculation for the row totals.

the cell ordinal decoration in this case must adjust cell ordinals for the removal of the "USA" row of data.

TABLE K

| Unit Sales | | | Drink (RS #0, DI #0) | Food (RS #0, DI #0) | Non-Consumables (RS #0, DI #0) | Total (RS #0, DI #0) |
|---|---|---|---|---|---|---|
| USA (RS #0, DI #0) | CA (RS #1, DI #0) | Bachelor's Degree (RS #2, DI #0) | 2 | 3 | 4 | 9 |
| USA (RS #0, DI #0) | CA (RS #1, DI #0) | Graduate Degree (RS #2, DI #0) | 1 | 2 | 3 | 6 |
| USA (RS #0, DI #0) | CA (RS #1, DI #0) | High School Degree (RS #2, DI #0) | 2 | 3 | 4 | 9 |
| USA (RS #0, DI #0) | CA (RS #1, DI #0) | Partial College (RS #2, DI #0) | 1 | 2 | 3 | 6 |
| USA (RS #0, DI #0) | CA (RS #1, DI #0) | Partial High School (RS #2, DI #0) | 2 | 3 | 4 | 9 |
| USA (RS #0, DI #0) | OR (RS #1, DI #0) | Bachelor's Degree (RS #2, DI #0) | 1 | 2 | 3 | 6 |
| USA (RS #0, DI #0) | OR (RS #1, DI #0) | Graduate Degree (RS #2, DI #0) | 2 | 3 | 4 | 9 |
| USA (RS #0, DI #0) | OR (RS #1, DI #0) | High School Degree (RS #2, DI #0) | 1 | 2 | 3 | 6 |
| USA (RS #0, DI #0) | OR (RS #1, DI #0) | Partial College (RS #2, DI #0) | 2 | 3 | 4 | 9 |
| USA (RS #0, DI #0) | OR (RS #1, DI #0) | Partial High School (RS #2, DI #0) | 1 | 2 | 3 | 6 |
| USA (RS #0, DI #0) | WA (RS #1, DI #0) | Bachelor's Degree (RS #2, DI #0) | 2 | 3 | 4 | 9 |
| USA (RS #0, DI #0) | WA (RS #1, DI #0) | Graduate Degree (RS #2, DI #0) | 1 | 2 | 3 | 6 |
| USA (RS #0, DI #0) | WA (RS #1, DI #0) | High School Degree (RS #2, DI #0) | 2 | 3 | 4 | 9 |
| USA (RS #0, DI #0) | WA (RS #1, DI #0) | Partial College (RS #2, DI #0) | 1 | 2 | 3 | 6 |
| USA (RS #0, DI #0) | WA (RS #1, DI #0) | Partial High School (RS #2, DI #0) | 2 | 3 | 4 | 9 |
| | Canada (RS #2, DI #0) | All Education Level (RS #3, DI #0) | 10 | 20 | 30 | 60 |

Without the 'hidden' context members or rowset/data item context information, the result set appears as follows in Table L.

TABLE L

| Unit Sales | | Drink | Food | Non-Consumables | Total |
|---|---|---|---|---|---|
| CA | Bachelor's Degree | 2 | 3 | 4 | 9 |
| CA | Graduate Degree | 1 | 2 | 3 | 6 |
| CA | High School Degree | 2 | 3 | 4 | 9 |
| CA | Partial College | 1 | 2 | 3 | 6 |
| CA | Partial High School | 2 | 3 | 4 | 9 |
| OR | Bachelor's Degree | 1 | 2 | 3 | 6 |
| OR | Graduate Degree | 2 | 3 | 4 | 9 |
| OR | High School Degree | 1 | 2 | 3 | 6 |
| OR | Partial College | 2 | 3 | 4 | 9 |
| OR | Partial High School | 1 | 2 | 3 | 6 |
| WA | Bachelor's Degree | 2 | 3 | 4 | 9 |
| WA | Graduate Degree | 1 | 2 | 3 | 6 |
| WA | High School Degree | 2 | 3 | 4 | 9 |
| WA | Partial College | 1 | 2 | 3 | 6 |
| WA | Partial High School | 2 | 3 | 4 | 9 |
| Canada | All Education Level | 10 | 20 | 30 | 60 |

Note this result set is in a 'standard' cross tab format that, along each edge, contains a set of homogeneous tuples with a single member from each hierarchy represented on that edge, which allows for the application of report level semantics, while the 'hidden' context information shown in the previous cross tab allows the result set to be rendered according to the original report's layout specification. Though not shown here, The techniques described herein make reference to the MDX query language and SQL query language, as MDX and SQL are currently the most prominent multidimensional data query language and relational database query language, respectively. However, the techniques described herein may be applied to other structured languages capable of querying any type of data structures. The examples used herein reference MDX and SQL but should not be understood to limit the application of the invention to MDX and SQL, as the techniques may be applied to any data querying language or tool, and any type of query result set.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but is not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable storage medium may be transmitted using any appropriate signal medium, including but not limited to wireless, wireline, optical fiber cable, RF, etc., or any suitable combination of the foregoing. Computer program code for carrying out operations for aspects of the present disclosure may be written in any combination of one or more programming languages, including an object-oriented programming language such as Java, Smalltalk, C++ or the like and conventional procedural programming languages, such as C, a multi-paradigm language such as Python, Ruby, or Clojure, or any other language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

The invention claimed is:

1. A computer implemented method, comprising: receiving, with a data access service, a query and a report specification from an enterprise software application, wherein the data access service is positioned between the enterprise software application and a data source; creating a run tree that comprises a sequence of executable decoration nodes; executing the query on the data source, thereby providing a query result set comprising query results drawn from the one or more data sources that are responsive to the query; and executing the sequence of decoration nodes on the query result set, wherein each of the decoration nodes modifies the query result set, thereby producing a decorated result set based on the query result set and the one or more decoration nodes, wherein producing the decorated result set comprises associating each of one or more members or values in the query results with a corresponding position or a calculated member in the report specification.

2. The method of claim 1, wherein for one or more of the decoration nodes, executing the decoration node comprises modifying the query result set in accordance with a decoration rule specific to that decoration node.

3. The method of claim 1, wherein associating each of the one or more members or values in the query results with a corresponding position in the report specification comprises associating each of the one or more members or values in the query results with a corresponding report rowset/column position in the report specification.

4. The method of claim 3, wherein associating each of the one or more members or values in the query results with a corresponding report rowset/column position in the report specification comprises associating each of the one or more members or values in the query results with a corresponding report rowset/column position in a tabular rowset in which there is a single row descriptor.

5. The method of claim 3, wherein associating each of the one or more members or values in the query results with a corresponding report rowset/column position in the report specification comprises associating each of the one or more members or values in the query results with a corresponding report rowset/column position in a multi-dimensional rowset.

6. The method of claim 1, wherein executing the sequence of decoration nodes on the query result set comprises using a context to determine which of two or more possible decoration rules to execute.

7. The method of claim 6, wherein using the context to determine which of two or more possible decoration rules to execute comprises evaluating a current context from a context stack.

8. The method of claim 1, wherein one or more of the executable decoration nodes is associated with one or more decoration rules, wherein each of the decoration rules modifies the query result set in a pre-defined manner.

9. The method of claim 1, wherein executing the sequence of decoration nodes on the query result set comprises executing any one or more types of decoration rules selected from among: calculated member decoration rules, empty row decoration rules, hierarchy decoration rules, hierarchy normalization rules, level decoration rules, measure decoration rules, member decoration rules, query calculation rules, and set decoration rules.

10. The method of claim 1, wherein one of the decoration nodes extracts any embedded metadata from the query result set.

11. The method of claim 1, further comprising defining the one or more decoration nodes, prior to executing the one or more decoration nodes on the query result set.

12. The method of claim 1, further comprising performing report level operations on the decorated result set.

13. The method of claim 1, further comprising rendering the decorated result set in accordance with a report layout to produce a finalized report output.

14. The method of claim 1, wherein the query conforms to a multidimensional query language.

15. The method of claim 1, wherein the query conforms to a relational database query language.

16. The method of claim 1, wherein executing the sequence of decoration nodes on the query result set comprises removing null or zero values from the query result set.

17. The method of claim 1, further comprising organizing the query with a query planner, prior to executing the query on the data source.

* * * * *